(12) United States Patent
Janssen

(10) Patent No.: US 9,120,518 B2
(45) Date of Patent: Sep. 1, 2015

(54) SEAT POST FOR A BICYCLE

(76) Inventor: Lars Janssen, Dieren (NL)

(*) Notice: Subject to any disclaimer, the term of this patent is extended or adjusted under 35 U.S.C. 154(b) by 0 days.

(21) Appl. No.: 13/531,893

(22) Filed: Jun. 25, 2012

(65) Prior Publication Data

US 2012/0326415 A1 Dec. 27, 2012

Related U.S. Application Data

(60) Provisional application No. 61/500,268, filed on Jun. 23, 2011.

(51) Int. Cl.
*B62J 1/08* (2006.01)
*B62K 19/36* (2006.01)

(52) U.S. Cl.
CPC ... *B62J 1/08* (2013.01); *B62K 19/36* (2013.01)

(58) Field of Classification Search
CPC ................ B62J 1/06; B62J 1/08; B62K 19/36
USPC ................................ 280/275, 283, 784, 281.1
See application file for complete search history.

(56) References Cited

U.S. PATENT DOCUMENTS

| 5,158,733 | A | * | 10/1992 | Trimble | 264/258 |
| 5,382,039 | A | * | 1/1995 | Hawker | 280/283 |
| 2011/0115193 | A1 | * | 5/2011 | Giroux | 280/281.1 |
| 2011/0248469 | A1 | * | 10/2011 | Chubbuck et al. | 280/276 |

FOREIGN PATENT DOCUMENTS

| DE | 805350 | C | | 5/1951 |
| EP | 0060750 | A1 | | 9/1982 |
| EP | 1803635 | A1 | | 7/2007 |
| FR | 928951 | A | | 12/1947 |
| GB | 671903 | A | | 5/1952 |
| GB | 671903 | | * | 5/1982 |
| GB | 671903 | A | * | 5/1982 |
| WO | WO2004/007269 | A1 | | 1/2004 |

* cited by examiner

*Primary Examiner* — Joseph Rocca
*Assistant Examiner* — Felicia L Brittman
(74) *Attorney, Agent, or Firm* — Bennett Jones LLP

(57) ABSTRACT

A seat post for a frame, the seat post comprising, a tubular section having a circumference; the tubular section including one or more slots; and the one or more slots extending through a portion of the circumference of the tubular section.

16 Claims, 5 Drawing Sheets

SEAT POST FOR A BICYCLE

FIELD OF THE INVENTION

This invention relates to bicycles or other similar wheeled vehicles, and more particularly, to a seat post for use with a bicycle and other types of wheeled vehicle.

BACKGROUND OF THE INVENTION

The seat post of a bicycle supports the seat of the bicycle connecting it to the bicycle frame. Known seat posts comprise a round, square or aerodynamic cross section with a continuous tube wall and a bracket at the top end to which the bicycle saddle or seat can be attached. The seat post normally is inserted in the seat tube of the bicycle and held in place by a clamp at the top of the seat tube.

Different materials have been used to save costs, increase strength and reliability and increase stiffness. Different shapes have been used and the aerodynamic shape has become quite common. The aerodynamic shape helps to reduce the overall drag of a bicycle frame particularly as it is normally used in conjunction with an aerodynamic seat tube. These seat tubes are however typically quite rigid, and as a result transmit shock and vibration directly to the seat and rider.

Many different configurations have been introduced to reduce vibration and shock through the seat tube, including springs, shock absorbing cylinders, mechanical levers and elastomer sleeves between the seat post and seat tube. These configurations typically add weight to the bicycle and can involve complicated mechanisms which are expensive to make.

In view of the foregoing, there remains a need for improvements in the art of seat posts for use with bicycles and like wheeled vehicles.

SUMMARY OF THE INVENTION

The present invention is directed generally to a seat post and seat post configuration suitable for use with a bicycle or other type of wheeled vehicle.

According to one embodiment, the present invention comprises a seat post for a frame comprising: a tubular section having a circumference; the tubular section includes one or more slots; and the one or more slots extend through a portion of the circumference of the tubular section.

According to another embodiment, the present invention comprises an aerodynamically shaped seat post for a bicycle frame, the aerodynamically shaped seat post comprises a leading edge and a trailing edge, and respective curved side edges formed between the leading edge and the trailing edge; and one or more slots extending through the trailing edge and a portion of the curved side edges towards the leading edge.

According to a further embodiment, the present invention comprises a seat tube mast for a bicycle frame, the seat tube mast comprises: a tubular section having a circumference; the tubular section includes one or more slots; and the one or more slots extending through a portion of the circumference of the tubular section.

According to yet another embodiment, the present invention comprises a bottom bracket; a top tube, a head tube, a down tube and a seat tube; one end of the top tube and one end of the down tube being affixed to the head tube, and another end of the top tube being affixed to one end of the seat tube; first and second seat stays, and first and second chain stays, and one end of each of the seat stays being affixed to the seat tube, and another end of each of the seat stays being affixed to respective ends of the chain stays; another end of the down tube and another end of the seat tube and another end of each of the chain stays forming a juncture for connecting or affixing the bottom bracket; the bottom bracket comprising a cavity configured for receiving a pedal crank shaft; the seat tube being configured to receive a seat post; and the seat post comprising a tubular section having a circumference; the tubular section including one or more slots; and the one or more slots extending through a portion of the circumference of the tubular section.

Other aspects and features of the present invention will become apparent to those ordinarily skilled in the art upon review of the following exemplary embodiments of the invention in conjunction with the accompanying figures.

BRIEF DESCRIPTION OF THE DRAWINGS

Reference will now be made to the accompanying drawings, which show by way of example, embodiments according to the present invention, and in which.

Like reference numerals indicate like elements in the drawings.

DETAILED DESCRIPTION OF THE EMBODIMENTS

Figure 1:
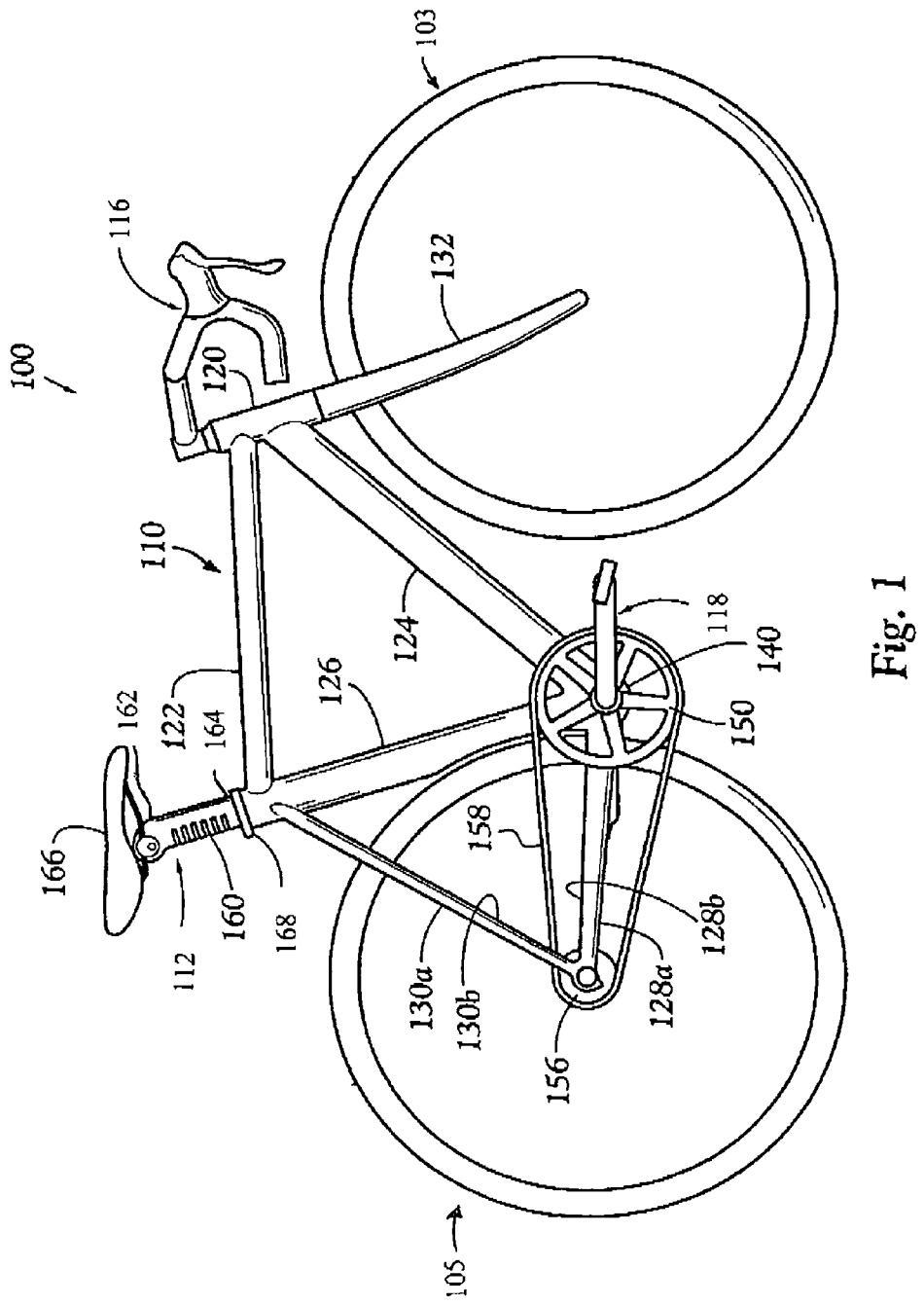
FIG. 1 shows a bicycle with a seat post according to an embodiment of the present invention.

Reference is first made to FIG. 1, which shows a bicycle generally indicated by reference 100 and configured with a seat post according to an embodiment of the present invention. The seat post is indicated generally by reference 112 in FIG. 1. While embodiments of the present invention are described in the context of a bicycle, it will be appreciated and understood that the invention may be suitable for other vehicles having a seat supported by post configuration.

As shown in FIG. 1, the bicycle 100 comprises a frame indicated generally by reference 110 and front and rear wheels indicated by references 103 and 105, respectively. The frame 110 is configured with the seat post assembly 112, a handlebar and headstock indicated by 116, and a pedal crank assembly 118, in known manner. The pedal crank assembly 118 comprises one or more chain wheels, indicated generally by reference 150. The frame 110 comprises a head tube 120, a top tube 122, a down tube 124, a seat tube 126, a pair of chain stays 128, indicated individually by references 128*a*, 128*b*, and a pair of seat stays 130, indicated individually by references 130*a*, 130*b*. The components of the frame 110 are assembled or otherwise affixed at respective ends using known techniques, such as welding or gluing, etc. . . . , as will be familiar to one skilled in the art. It will also be apparent to one skilled in the art that the frame 110 may comprise additional tubes or tube configurations, and the frame 110 depicted in FIG. 1 is merely illustrative of a typical bicycle frame.

The front wheel 103 is coupled in known manner to the frame 110 through a front fork assembly 132. Similarly, the rear wheel 105 is connected or attached to the frame 110 at the junction of the chain stays 128 and the seat stays 130. In known manner, the rear wheel 105 includes a rear gear (e.g. a gear or a gear pack) 156 which is coupled to the pedal crank assembly 108, i.e. the chain wheel(s) 150, through a chain 158 for example. The bottom bracket 140 couples and supports the pedal crank assembly 118. The rear wheel 103 is driven by the rotational forces applied to the pedal crank assembly 118 and transferred to the rear gear 156 through the chain wheel 150 and the chain 158.

As shown in FIG. 1, the seat post assembly 112 according to an embodiment comprises a seat post 160 according to an embodiment of the invention. The seat post 160 has a top end 162 which is configured to attach or otherwise mount a seat indicated generally by reference 166. The seat post 160 also comprises a lower or bottom end 164 that is inserted into the seat tube 126 of the frame 110. The height of the seat 166 is adjusted by changing the position of the seat post 160 in the seat tube 126, and utilizing a seat clamp 168 to lock the seat post 160 (and the seat 166) in the desired position.

Figure 2:
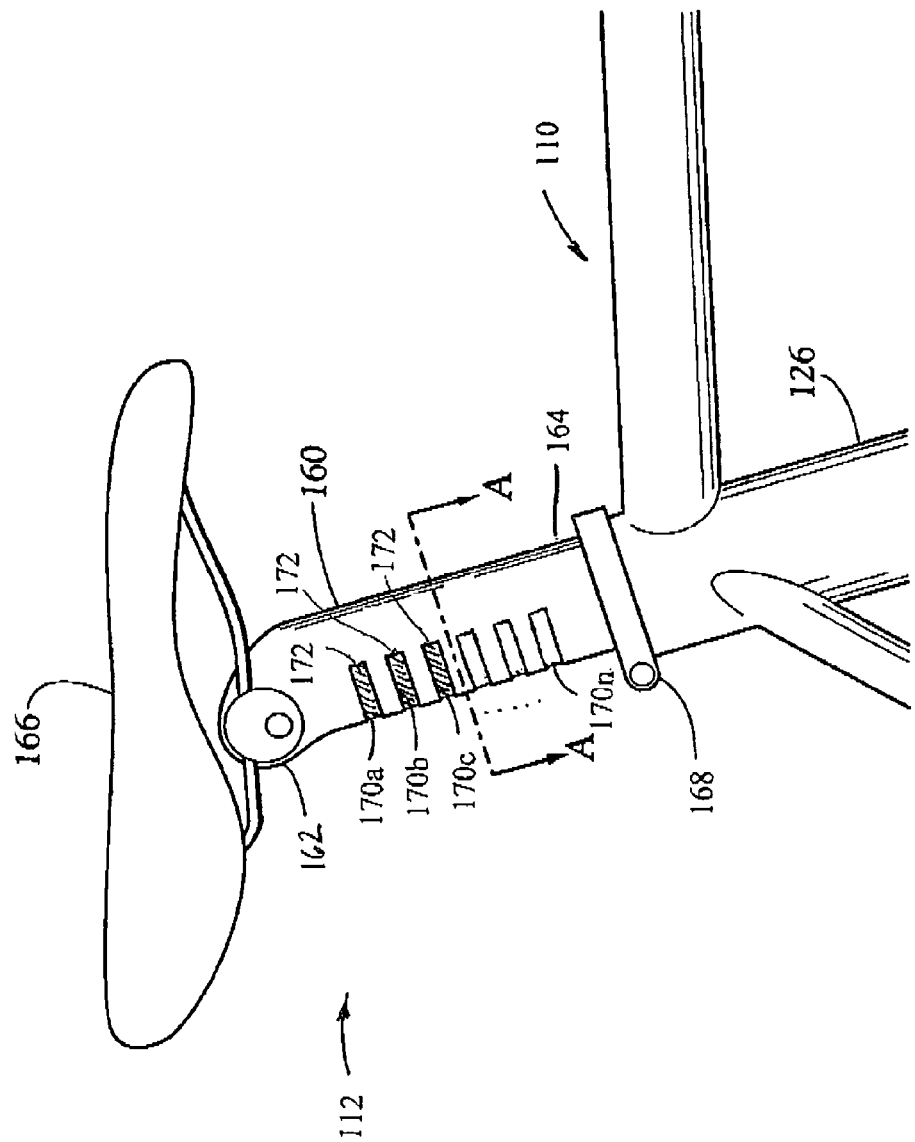
FIG. 2 is an isolated view of the seat post of FIG. 1.

Reference is next made to FIG. 2, which shows the seat post assembly 112 in more detail and according to an embodiment of the invention. As shown in FIG. 2, the seat post 160 is mounted in the seat tube 126 and held in place with the seat tube clamp 168. The seat 166 is mounted to the top end 162 of the seat post 160 using a clamp mechanism, a bolted configuration or a suitable connectors or fasteners. According to another aspect, the seat post 160 comprises a circular, square, aerodynamic or other shaped cross section or geometry which may or may not match the cross section of the seat tube 126 for the frame 110. In accordance with an embodiment according to the present invention, the seat post 160 is configured with one or more gaps or slots 170, indicated individually by references 170a, 170b, 170c . . . 170n in FIG. 2. The gaps 170 are in a generally horizontal orientation with respect to the longitudinal axis defined by for the seat tube 126. According to another aspect, the number, angle, geometry and dimensions of the gaps 170 is based in part on the properties of the material used for the seat tube 126 and/or the desired properties of the seat tube 126 and/or the seat post 160, as will be described in more detail below.

The gaps or slots 170 in the seat tube 160 are configured to allow the seat tube 160 to flex. According to an exemplary implementation, the gaps or slots are suitably dimensioned to provide flexing without substantially weakening the structure, and the final dimensions will depend in part on the strength of the material utilized for the seat tube. According to another aspect, the size, number and/or location of the gaps 160 are configured to achieve a desired amount of flexure and/or direction of flexure. The flexure allows the seat post 160 to absorb some of the shock and vibration transmitted through the bicycle frame 110 and thereby reduces the amount of vibration transmitted to the seat 166 and subsequently to the rider.

In accordance with another embodiment, the gaps or slots 170 (i.e. some or all) are fully or partially filled with a damping material, such as an elastomer or similar material indicated generally by reference 172 in FIG. 2. The damping material 172 functions to further dampen vibrations transmitted through the seat post 160. For instance, as the seat tube 160 flexes the edges of the slots 170 move closer together and then farther apart and vice versa. The damping material 172 functions to dampen this movement by resisting the closing (and also restricting the opening). In accordance with a further aspect, the damping material 172 is inserted into one or more individual gaps or slots 170, for example, the slots 170a and 170b. In accordance with another aspect, the slots 170 and the adjoining internal void volume in the seat post 160 is filled with the damping material 172.

Figure 3:
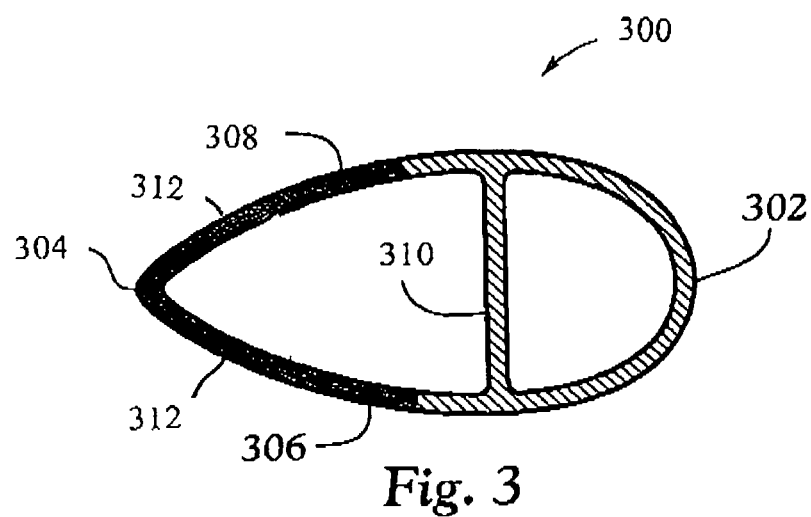
FIG. 3 is a sectional view of the seat post according to an embodiment of the invention and taken across Line A-A in FIG. 2.

Reference is made to FIG. 3, which shows a cross-sectional view of a seat post according to an embodiment of the present invention and indicated generally by reference 300. The section is taken along the Line A-A in FIG. 2. The seat post 300 comprises an aerodynamic shape with a leading edge 302, a trailing edge 304 and curved side edges 306 and 308. According to an embodiment, the seat post 300 includes an internal wall 310, which functions to reinforce or strengthen the seat post structure. According to an embodiment, the seat post 300 is configured with one or more gaps or slots indicated by 312, for example, as described above for gaps or slots 170 (FIG. 2). As shown, the gap 312 extends from the trailing edge 304 forward through the sides 306 and 308. To maintain structural strength for the seat post 300, the slots 312 do not extend to, or do not breach, the internal wall 310. This configuration maintains the structural strength of the closed cross-section formed by the internal wall 310 and the forward portions of the side walls 306, 308 extending from the internal wall 310 to the leading edge 302. According to another embodiment, the gaps or slots 312 may be extended forward to the internal wall 310 or past the internal wall 310, for example, where the structural strength is not critical for the bicycle design or application, or structural strength is achieved through the utilization of materials or fabrication techniques.

Figure 4:
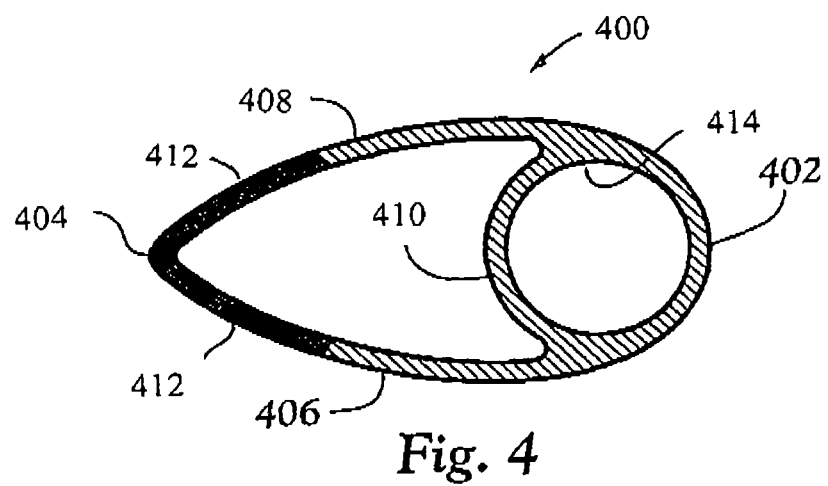
FIG. 4 is a sectional view of the seat post according to a second embodiment of the present invention and corresponds to the section taken through Line A-A in FIG. 2.

Reference is next made to FIG. 4, which shows a cross-sectional view of a seat post according to an embodiment of the present invention and indicated generally by reference 400. The section is taken along the Line A-A in FIG. 2. The seat post 400 comprises an aerodynamic shape with a leading edge 402, a trailing edge 404 and curved sides 406 and 408. According to an embodiment, the seat post 400 includes a curved internal wall 410, which functions to reinforce or strengthen the seat post structure. According to an aspect, the seat post 400 comprises a circular tube 414 and the internal wall 410 is continuation of the curved sides or radius of the internal circular tube 414. According to an embodiment, the seat post 400 is configured with one or more gaps or slots indicated by 412, for example, as described above for gaps or slots 170 (FIG. 2). As shown, the gap 412 extends from the trailing edge 404 forward through the sides 406 and 408. To maintain structural strength for the seat post 400 and according to an embodiment, the gaps or slots 412 do not extend to, or do not breach, the internal wall 410. This configuration maintains the structural strength of the closed cross section formed by the internal circular tube 414. According to another embodiment, the gaps or slots 412 may be extended forward to the internal wall 410 or past the internal wall 410, for example, where the structural strength is not critical for the bicycle design or application, or structural strength is achieved through the utilization of materials or fabrication techniques.

Figure 5:
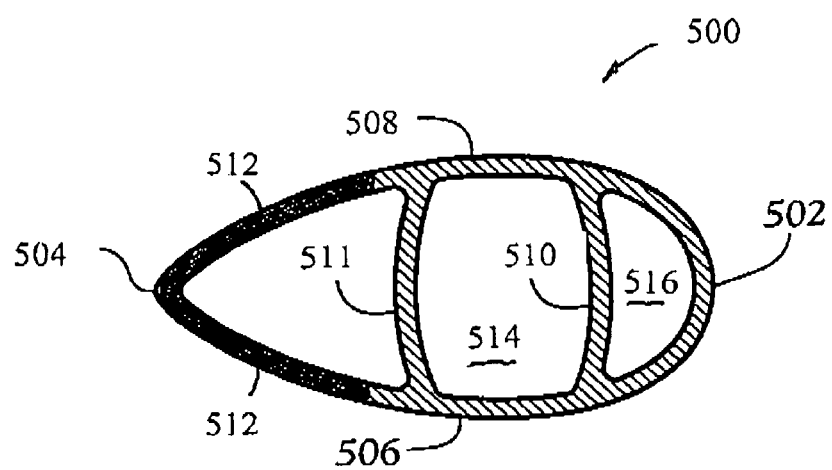
FIG. 5 is a sectional view of the seat post according to another embodiment of the present invention and corresponds to the section taken through Line A-A in FIG. 2.

Reference is next made to FIG. 5, which shows a cross-sectional view of a seat post according to an embodiment of the present invention and indicated generally by reference 500. The section is taken along the Line A-A in FIG. 2. The seat post 500 comprises an aerodynamic shape with a leading edge 502, a trailing edge 504 and curved side edges or side walls 506 and 508. According to an embodiment, the seat post 500 includes first and second internal walls 510 and 511, which form respective tubular sections 514 and 516, and function to reinforce or strengthen the seat post structure. According to an embodiment, the seat post 500 is configured with one or more gaps or slots indicated by 512, for example, as described above for gaps or slots 170 (FIG. 2). As shown, the gap 512 extends from the trailing edge 504 forward through the sides 506 and 508, respectively. To maintain structural strength for the seat post 500 and according to an embodiment, the gaps or slots 512 do not extend to, or do not breach, the internal wall 511. This configuration maintains the structural strength of the closed cross sections formed by the internal walls 511 and 510 and the internal wall 510 and the forward portions of the side walls 506, 508 extending from the internal wall 511 to the leading edge 502. According to another embodiment, the gaps or slots 512 may be extended forward to the internal wall 511, or past the internal wall 511, for example, where the structural strength is not critical for the bicycle design or application, or structural strength is achieved through the utilization of materials or fabrication techniques.

Figure 6:
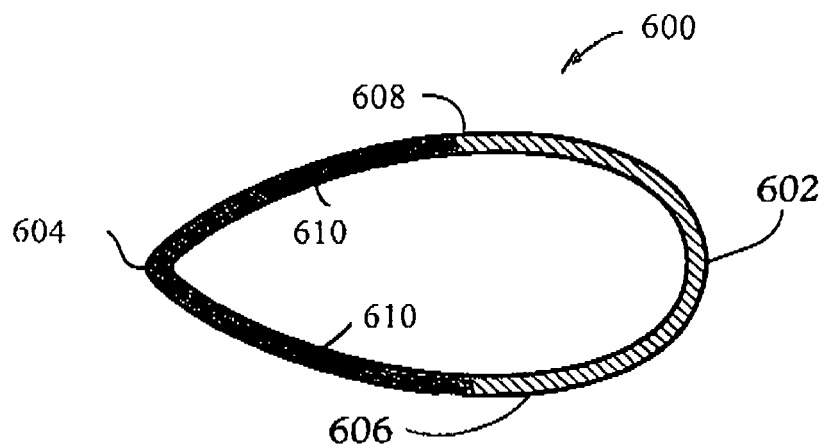
FIG. 6 is a sectional view of the seat post according to a further embodiment of the present invention and corresponds to the section taken through Line A-A in FIG. 2.

Reference is next made to FIG. 6, which shows a cross-sectional view of a seat post according to an embodiment of the present invention and indicated generally by reference 600. The section is taken along the Line A-A in FIG. 2. The seat post 600 comprises an aerodynamic shape with a leading edge 602, a trailing edge 604 and curved side edges or side walls 606 and 608. According to an embodiment, the seat post 600 is configured with one or more gaps or slots indicated by 612, for example, as described above for gaps or slots 170 (FIG. 2). As shown, the gap or slot 612 extends from the trailing edge 604 forward through the sides 606 and 608. To maintain structural strength for the seat post 600, the slots 612 do not extend all the way forward to the leading edge 602.

While FIGS. 3 to 6 illustrated embodiments of the seat post 112 with aerodynamic cross-sections or profiles, it will be appreciated that the seat post 112 may also comprise a circular cross-section or geometry with one or more gaps or slots 170 as described above.

Figure 7:
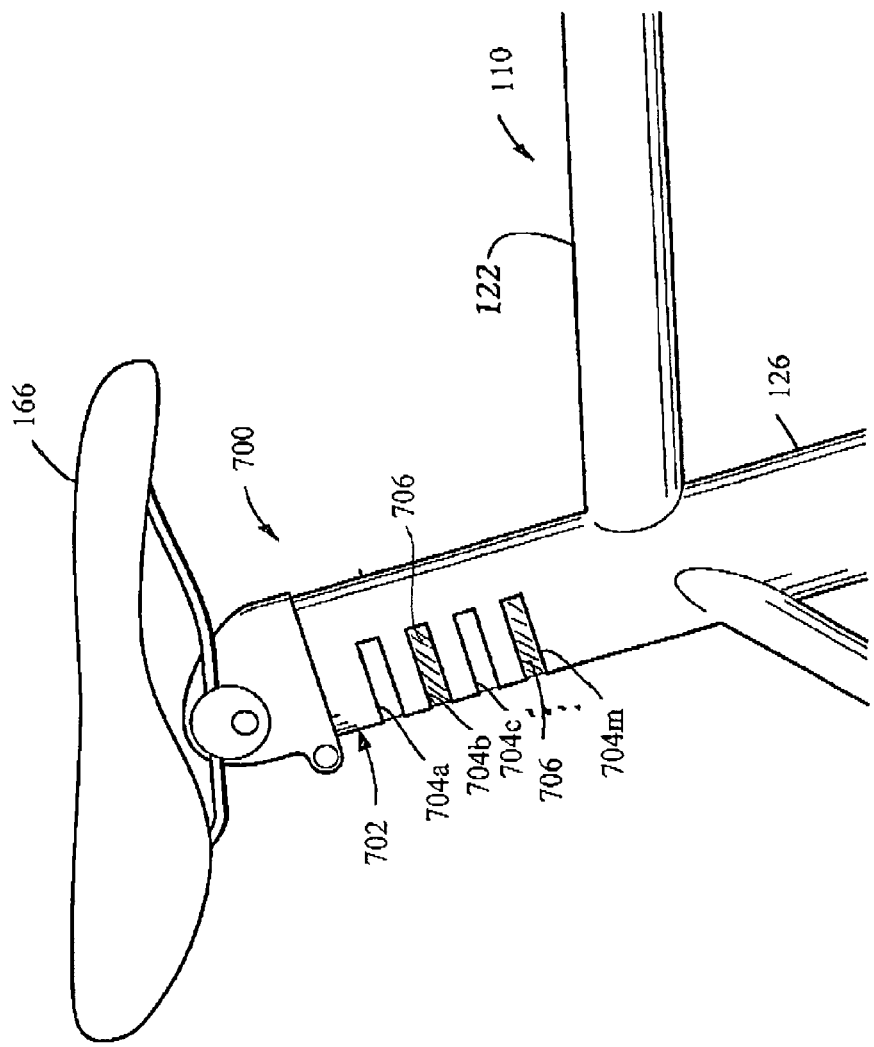
FIG. 7 is an isolated view of a seat post configuration in accordance with another embodiment of the present invention.

Reference is made to FIG. 7, which shows a seat tube mast according to another embodiment of the present invention and indicated generally by reference 700. The seat tube mast 700 replaces the seat post configuration described above for FIG. 1 and is formed in the seat tube 126 of the frame 110. The seat tube mast 700 includes a top end 702 is configured in known manner to attach or otherwise connect to the seat 166. As shown in FIG. 7, the seat tube mast 700 comprises one or more gaps or slots 704, indicated individually by references 704a, 704b, 704c . . . 704m. The gaps or slots 704 are configured as described above. According to an embodiment, the gaps or slots 704 may be partially or fully filled with a dampening material 706 as also described above. According to another aspect, the seat tube mast 700 can be configured with the geometries and/or slot arrangements as described above.

The present invention may be embodied in other specific forms without departing from its spirit or essential characteristics. The embodiments described and disclosed are to be considered in all aspects only as illustrative and not restrictive. The scope of the invention is, therefore, indicated by the appended claims rather that by the foregoing description. All changes which come within the meaning and range of equivalency of the claims are to be embraced within their scope.

What is claimed is:

1. A seat post for a frame, said seat post comprising:
   a tubular section having a circumference;
   said tubular section including one or more slots and having a longitudinal axis;
   said one or more slots extending entirely through a portion of the circumference of said tubular section and said one or more slots configured in a horizontal orientation with respect to said longitudinal axis; and
   wherein said one or more slots are configured to allow flexing of said seat post so as to dampen vibration.

2. The seat post as claimed in claim 1, wherein one or more of said slots comprises a dampening material.

3. The seat post as claimed in claim 1, wherein a portion of said tubular section adjacent said one or more slots is filled with a dampening material.

4. A seat post for a bicycle frame, said seat post comprising:
   a leading edge and a trailing edge, and respective curved side edges formed between said leading edge and said trailing edge;
   one or more slots extending entirely through the trailing edge and a portion of said curved side edges towards said leading edge; and
   wherein said one or more slots are configured to allow flexing of said seat post so as to dampen vibration transmitted through the bicycle frame.

5. The seat post as claimed in claim 4, wherein said one or more slots are configured generally perpendicular to the longitudinal axis of the seat post.

6. The seat post as claimed in claim 5, further including a dampening material in one or more of said slots.

7. The seat post as claimed in claim 4, further including an internal wall extending generally between said respective curved side edges and forming a junction with said respective curved side edges, and said one or more slots extending through the trailing edge and a portion of said curved side edges to a position before said junction.

8. The seat post as claimed in claim 7, wherein said curved side edges and said internal wall form an internal void and said internal void being filled with a dampening material in a section at least adjacent to said one or more slots.

9. A seat tube mast for a bicycle frame, said seat tube mast comprising:
   a tubular section having a circumference and a longitudinal axis;
   said tubular section including one or more slots;
   said one or more slots extending entirely through a portion of the circumference of said tubular section and said one or more slots being configured in a horizontal orientation with respect to said longitudinal axis; and
   wherein said one or more slots are configured to allow flexing of said seat tube mast so as to dampen vibration.

10. The seat tube mast as claimed in claim 9, wherein a plurality of said one or more of said slots comprises a dampening material.

11. The seat tube mast as claimed in claim 9, wherein a portion of said tubular section adjacent said one or more slots is filled with a dampening material.

12. The seat tube mast as claimed in claim 9, wherein said tubular section comprises a leading edge and a trailing edge, and respective curved side edges formed between said leading edge and said trailing edge, and said one or more slots extending from said trailing edge through a section of said respective curved edges.

13. A bicycle frame comprising:
   a bottom bracket;
   a top tube, a head tube, a down tube and a seat tube;
   one end of said top tube and one end of said down tube being affixed to said head tube, and another end of said top tube being affixed to one end of said seat tube;
   first and second seat stays, and first and second chain stays, and one end of each of said seat stays being affixed to said seat tube, and another end of each of said seat stays being affixed to respective ends of said chain stays;

another end of said down tube and another end of said seat tube and another end of each of said chain stays forming a juncture for connecting or affixing said bottom bracket;

said bottom bracket comprising a cavity configured for receiving a pedal crank shaft;

said seat tube being configured to receive a seat post; and said seat post comprising a tubular section having a circumference and a longitudinal axis;

said tubular section including one or more slots; and said one or more slots extending entirely through a portion of the circumference of said tubular section and said one or more slots configured in a horizontal orientation with respect to said longitudinal axis; and wherein said one or more slots are configured to allow flexing of said seat post so as to dampen vibration from the bicycle frame.

14. The bicycle frame as claimed in claim 13, wherein a plurality of said one or more of said slots comprises a dampening material.

15. The bicycle frame as claimed in claim 13, wherein a portion of said tubular section adjacent said one or more slots is filled with a dampening material.

16. The bicycle as claimed in claim 13, wherein said tubular section comprises a leading edge and a trailing edge, and respective curved side edges formed between said leading edge and said trailing edge, and said one or more slots extending from said trailing edge through a section of said respective curved edges.

* * * * *